(12) United States Patent
Lindemann et al.

(10) Patent No.: US 7,938,246 B2
(45) Date of Patent: May 10, 2011

(54) STOP MODULE, IN PARTICULAR FOR AUTOMATIC MACHINING AND CONVEYOR SYSTEMS

(75) Inventors: Uwe Lindemann, Holzgerlingen (DE); Peter Ludwig, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 12/257,772

(22) Filed: Oct. 24, 2008

(65) Prior Publication Data

US 2009/0159399 A1    Jun. 25, 2009

(30) Foreign Application Priority Data

Dec. 21, 2007 (DE) .................. 10 2007 062 075

(51) Int. Cl.
*B23Q 16/00* (2006.01)
*B23Q 7/00* (2006.01)
(52) U.S. Cl. .................... 198/345.3; 193/35 A
(58) Field of Classification Search ............... 193/35 A; 198/345.3, 530, 531, 463.4, 463.5, 463.6, 198/459.6, 459.7
See application file for complete search history.

(56) References Cited

U.S. PATENT DOCUMENTS

| | | | | |
|---|---|---|---|---|
| 3,819,023 A * | 6/1974 | McClelland | .................... | 193/40 |
| 3,970,180 A * | 7/1976 | Schlottmann et al. | ...... | 193/35 A |
| 4,310,073 A * | 1/1982 | Haring | .......................... | 188/62 |
| 4,397,386 A * | 8/1983 | Kampf | ...................... | 198/464.4 |
| 5,199,537 A * | 4/1993 | Worner et al. | ................ | 188/266 |
| 6,119,843 A * | 9/2000 | Robinson | .................... | 193/35 A |
| 7,232,025 B1 * | 6/2007 | Warren et al. | ............. | 198/345.1 |
| 7,258,356 B2 * | 8/2007 | Okazaki et al. | .............. | 280/272 |
| 7,559,419 B2 * | 7/2009 | Unterhuber | ................ | 198/345.3 |
| 7,565,960 B2 * | 7/2009 | Worner et al. | .............. | 198/459.6 |
| 2007/0089947 A1 | 4/2007 | Worner et al. | | |

FOREIGN PATENT DOCUMENTS

| | | |
|---|---|---|
| DE | 38 06 436 | 9/1989 |
| DE | 60 2004 001 185 | 10/2006 |
| EP | 1 777 177 | 4/2007 |

* cited by examiner

*Primary Examiner* — Douglas A Hess
(74) *Attorney, Agent, or Firm* — Michael J. Striker

(57) ABSTRACT

A stop module has a base body, a stop element configured for objects moving in a direction of motion in a movement plane and located on the base body, a drive device for moving the stop element between a first terminal position, in which the stop element protrudes into the movement plane of the objects, and a second terminal position, in which the stop element enables a motion of objects in the movement plane, and a damping device cooperating with the stop element for damping a motion of the stop element from a first stop position into a second terminal stop position, which is offset relative to the first stop position at least approximately in the direction of motion of the objects, when an object is resting on the stop element, the damping device being configured so as to damp the motion of the stop element from the first stop position to the second terminal stop position with a rotation damper.

14 Claims, 6 Drawing Sheets

STOP MODULE, IN PARTICULAR FOR AUTOMATIC MACHINING AND CONVEYOR SYSTEMS

CROSS-REFERENCE TO A RELATED APPLICATION

The invention described and claimed hereinbelow is also described in German Patent Application DE 10 2007 062 075.8 filed on Dec. 21, 2007. This German Patent Application, whose subject matter is incorporated here by reference, provides the basis for a claim of priority of invention under 35 U.S.C. 119(a)-(d).

BACKGROUND OF THE INVENTION

The present invention relates to a stop module, in particular for automated machining and conveyor systems, in which a stop element for objects moving in a direction of motion in a movement plane is located on a base body.

In automated machining and conveyor systems that are embodied for conveying objects, in particular workpieces or workpieces located on workpiece holders, it can be necessary for various reasons to stop the conveyance of the individual objects, in particular for performing machining operations on the workpieces during the standstill phase, but also for lifting the workpieces or workpiece holders. For that purpose, stop modules with a stop element can be located on automated conveyor systems, and the stop element can be moved between a first extended position, in which the stop element intervenes in the path of motion of the objects conveyed on the conveyor system, and a second, lowered position, in which the stop element enables conveyance of objects conveyed on the conveyor system.

From European Patent Disclosure EP 1 777 177 A1, for instance, a stop module with a stop member located on a base body, for objects moving in a current direction of motion is known. In it, the stop member is movable by means of an electric actuator out of this movement plane in each downward stroke and back into the movement plane in each upward stroke. Moreover, a damping device connected to the stop member is provided, for moving the stop member in damped fashion from a first stop position to a second terminal stop position. Moreover, the stop module is embodied with restoring means for restoring the stop member from the second terminal stop position to the first stop position. In this reference, it is proposed that the damping device have at least one damping piston, movable in at least one damping cylinder and coupled with the stop member, and a throttle restriction, which damps the piston motion and forms a flow resistance for pressure fluid flowing out during the piston motion; in the tripping position, the damping cylinder communicates with the pressure chamber via at least one pressure line.

Disadvantageously, the structural complication involved in damping a motion, caused by an object striking the stop member, of the stop member between the first stop position and the second terminal stop position is high, and hence manufacturing such a stop module entails relatively high costs.

SUMMARY OF THE INVENTION

It is the object of the present invention to create a stop module, in particular for automated machining and conveyor systems, in which a motion of a stop element from a first terminal position to a second terminal position can be damped structurally simply and effectively.

This object is attained with a stop module, in particular for automated machining and conveyor systems, in which a stop element for objects moving in a direction of motion in a movement plane is located on a base body, and in which the stop element is movable by means of a drive device between a first terminal position, in which the stop element protrudes into the movement plane of the objects, and a second terminal position, in which the stop element enables a motion of objects in the movement plane, and in which a damping device cooperating with the stop element is provided, in order to damp a motion of the stop element from a first stop position into a second terminal stop position, which is offset relative to the first stop position at least approximately in the direction of motion of the objects, when an object is resting on the stop element. According to the invention, it is provided that the damping device damps the motion of the stop element from the first stop position to the second terminal stop position with a rotation damper.

A stop module according to the invention has the advantage that a motion of a stop element from a first terminal position to a second terminal position is damped structurally simply and effectively. It is also advantageous that when objects moving in a direction of motion in a movement plane are stopped by the stop element, only relatively slight forces act on them.

Especially if the moving objects are embodied as workpieces or workpiece holders with workpieces located on them, damage to the workpiece or shifting of the workpiece, which may perhaps be loosely located on the workpiece holder, can advantageously be prevented by means of stopping the workpiece or workpiece holder gently.

In an advantageous refinement of the invention, the rotation damper can have an inner rotor and an outer rotor and is embodied in particular as a Gerotor, and the outer rotor is located eccentrically to the inner rotor, and a number of recesses that cooperate with teeth of the inner rotor is greater by one than the number of teeth of the inner rotor.

In order in a simple way to generate a braking moment acting on the stop element, it can be provided in an advantageous embodiment of the invention that the rotation damper has a throttle restriction, embodied in particular adjustably, by means of which throttle restriction, feed flow generated by the rotation damper during a rotation can be throttled.

In a structurally simple arrangement of the rotation damper, the inner rotor of the rotation damper is located on an axle with a rotary lever that converts the at least approximately translational motion of the stop element between its first stop position and its second stop position into a rotary motion.

To assure the return of the stop element from its second terminal stop position to its first terminal position with very little force, it is provided in an advantageous embodiment of the invention that the inner rotor of the rotation damper cooperates with the rotary lever via a freewheel device, and the freewheel device decouples the inner rotor of the rotation damper from a rotation of the rotary lever; this rotation is such that it moves the stop element from its second terminal stop position into its first stop position.

To assure a return of the stop module from its second de to its first terminal position in a simple way, a restoring device may be provided.

In a very simple arrangement of the restoring device, the restoring device cooperates with the stop element via the rotary lever and can as a result move the stop element from its second terminal stop position to its first terminal position.

In a very simple embodiment of the invention, it may be provided that the drive device is embodied as an electrical rotary drive. Electrical rotary drives are distinguished by a relatively compact construction, so that they can be easily integrated with the stop module, and the structural size of the stop module can advantageously be made quite small.

In an advantageous embodiment of the stop module, the motion of the stop element in and out of the movement plane of objects is implemented by means of a toggle lever device cooperating with the electrical rotary drive, which toggle lever device has at least two lever elements, connected to one another via a first pivot point, and the electrical rotary drive cooperates with the first pivot point. Advantageously, only very slight forces are required for moving the stop element between its first terminal position and its second terminal position, as a result of a suitable arrangement of the lever elements of the toggle lever device. As a result, the electrical rotary drive cooperating with the toggle lever device can advantageously be small and can thus be embodied correspondingly inexpensively. Moreover, with a toggle lever device and a suitably embodied stop element, it is possible to keep the stop element in its first terminal position, when an object is in contact with the stop element, with only little or no contrary force.

In an advantageous embodiment of a stop module according to the invention, it is provided that the electrical rotary drive cooperates with the toggle lever device via a connecting rod assembly. By means of the connecting rod assembly, a rotary motion originating in the electrical rotary drive can be converted in a simple way into a translational motion acting on the toggle lever device.

In a simple embodiment of the toggle lever device, the first lever element of the toggle lever device, in a first terminal region, is located rotatably on the base body via a second pivot point and in a second terminal region cooperates rotatably, via the first pivot point, with a first terminal region of the second lever element, and a second terminal region of the second lever element cooperates, via a third pivot point, with a third lever element, which is fixed rotatably on the base body via a fourth pivot point.

If the third lever element is embodied as a stop element, then the stop element can be moved in a very simple way, via the toggle lever device in what in particular is a rotary motion, between its first terminal position and its second terminal position; in a suitable arrangement of the stop element on the toggle lever device, a force exerted on the stop element by an object in contact with the stop element can be used to execute the rotary motion of the stop element.

For implementing the at least approximately vertically extending motion exerted on the toggle lever device by the electrical rotary drive, which is embodied in particular as a stepping motor, it may be provided in a simple embodiment of a stop module of the invention that the connecting rod assembly, on its end remote from the toggle lever device, cooperates with a hub element that can be driven by the electrical rotary drive, and what is in particular a round end region of the connecting rod assembly is located eccentrically to a drive shaft of the electrical rotary drive in such a way that a rotation of the hub element results in an at least partially vertical motion of the connecting rod assembly, and by means of this motion the stop element can be moved between its first terminal position and its second terminal position via the toggle lever device.

If the first lever element and the second lever element of the toggle lever device, when the stop element is located in the first position, are located at least approximately parallel to one another, any forces that might be acting on the stop element in the direction of motion of the objects can be intercepted by the toggle lever device, since a force acting in this case at least approximately in the direction of the lever elements generates only little force, or none, perpendicularly to the lever elements, or in other words acting on the connecting rod assembly.

An especially simply embodied stop element has a body, extending in the direction of motion of the objects, which in a first terminal region, oriented toward the third lever element, has a recess extending at least approximately in the direction of motion of the objects, by way of which recess the stop element cooperates with the third lever element.

The restoring device may have a spring assembly embodied as a compression spring or as a tension spring, in particular a constant-force spring, which is located on the rotary lever that in turn cooperates with the second terminal region of the stop element.

Further advantages and advantageous features of the subject of the invention will become apparent from the claims and the exemplary embodiments described in conjunction with the drawings.

DESCRIPTION OF THE PREFERRED EMBODIMENTS

Figure 1:
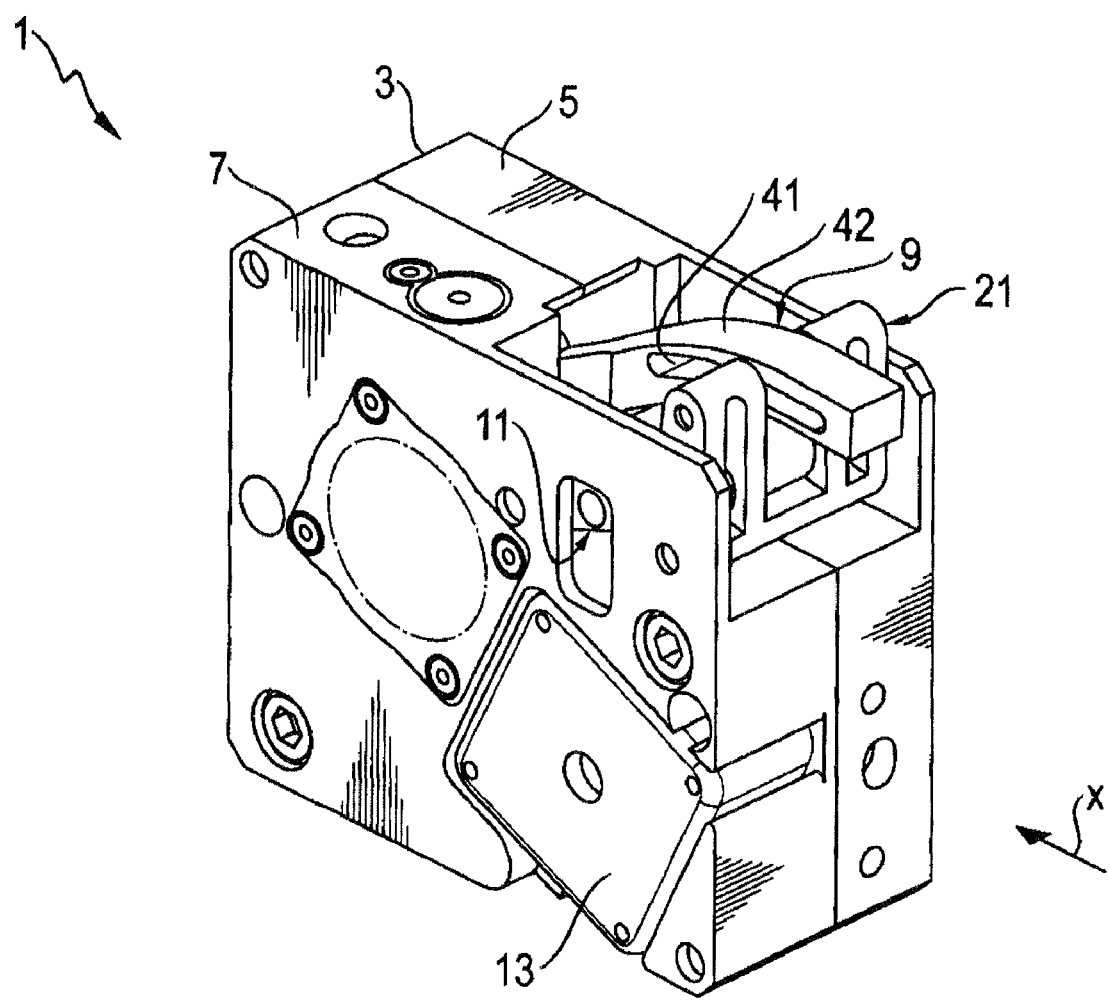
FIG. 1 is a three-dimensional view of a stop module, with a stop element shown in an upper first position.

FIGS. 1 through 5 show a first exemplary embodiment of a stop module 1, which is used in particular in automated machining and conveyor systems, in order to separate objects, such as workpieces, workpiece holders, or the like, that are moving in a direction of motion X in a movement plane. After the objects have been separated, they can be individually handled, for instance machined, diverted, and so forth.

The stop module 1 is embodied with a base body 3, which is composed here of two base body elements 5 and 7. The stop module 1 furthermore has a stop element 9, which is provided for stopping or separating objects moving in the direction of motion X; the stop element 9 is movable by means of a toggle lever device 11 from a first terminal position, shown in FIG. 1 and protruding into the movement plane of the objects, into a lower, second terminal position that enables a motion of the objects both in the direction of motion X, and vice versa. For driving the toggle lever device, a drive device embodied as a electrical rotary drive 13 is provided.

Figure 2:
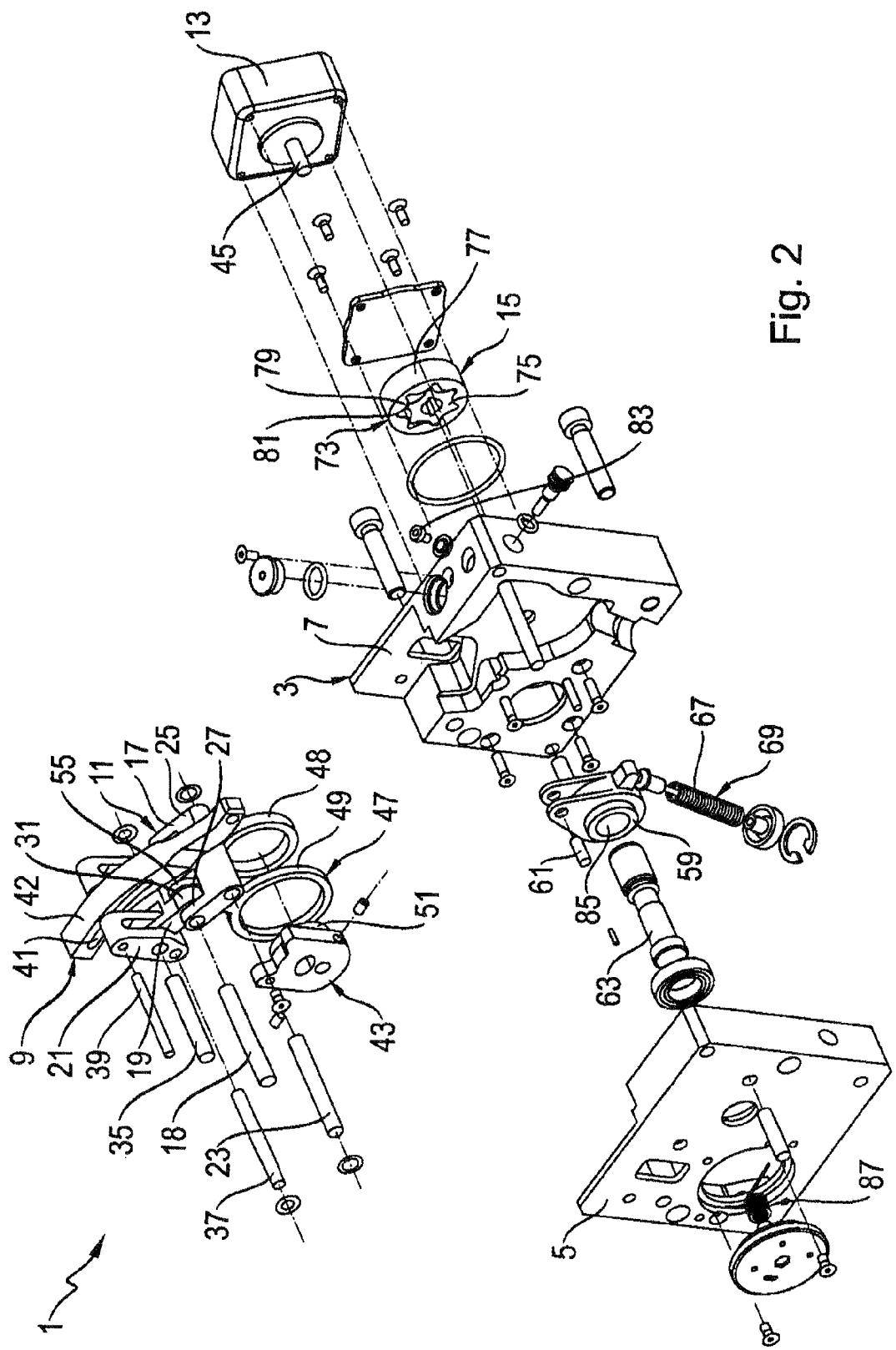
FIG. 2 is an exploded view of the stop module of FIG. 1.

The individual elements of the stop module 1 and their three-dimensional location relative to one another can be seen from the exploded view in FIG. 2.

Besides a mechanism for moving the stop element 9 into and out of the movement plane of the objects, the stop module 1 also has a damping device 15, for damping an object coming into contact with the stop element 9.

Below, the mechanism for moving the stop element 9 into and out of the movement plane of the objects will first be described in detail.

Figure 3:
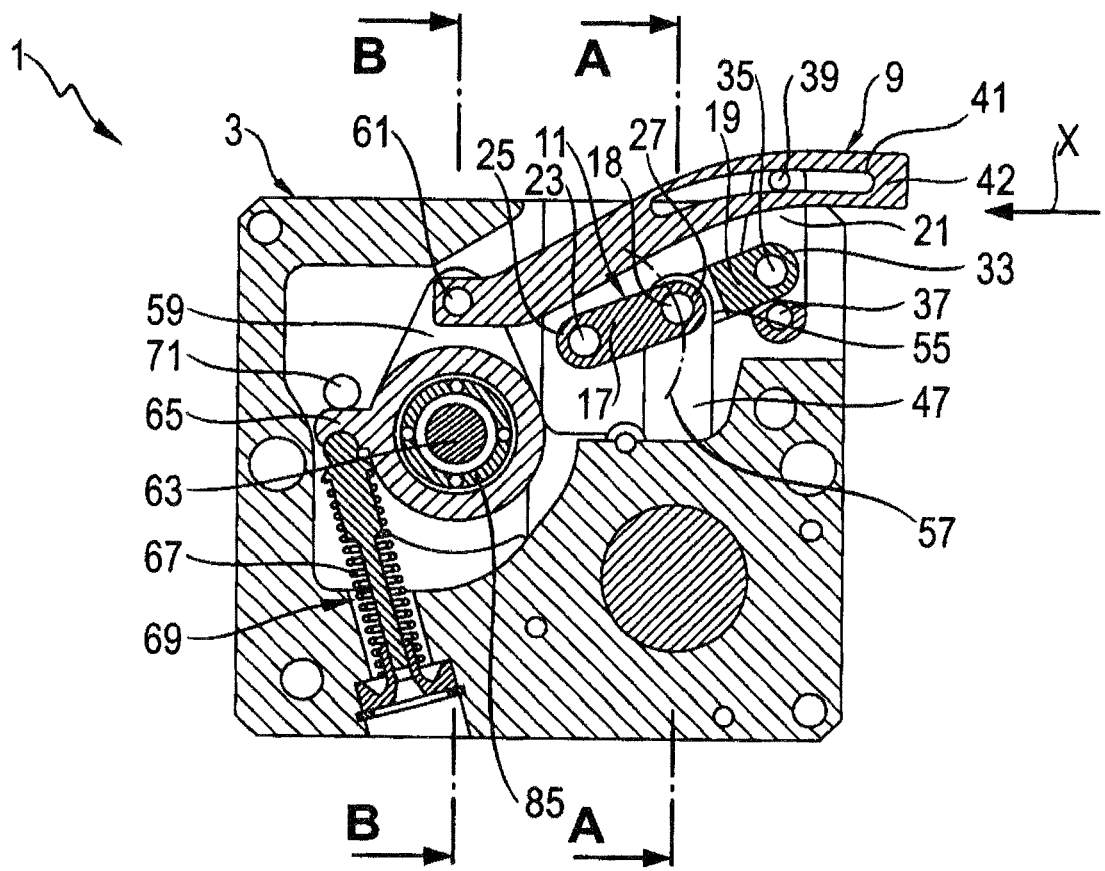
FIG. 3 is a center sectional view through the stop module of FIG. 1.

In FIG. 3, a section through a center axis of the stop module 1 is shown. The toggle lever device 11 can be seen, which is embodied with a first lever element 17 and a second lever element 19, joined to the first lever element 17 via a first pivot point 18; the second lever element 19 of the toggle lever device 11 cooperates with a further, third lever element 21, which in turn cooperates with the stop element 9 of the stop module 1.

A first terminal region 25 of the first lever element 17 of the toggle lever device 11 is located rotatably, via a pin element forming a second pivot point 23, in the base body 3 of the stop module 1. A second terminal region 27 of the first lever element 17, located diametrically opposite the first terminal region 25 of the first lever element 17, is pivotably connected to a first terminal region 31 of the second lever element 19, by means of a second pin element forming the first pivot point 18. A second terminal region 33 of the second lever element 19, diametrically opposite the first terminal region 31 of the second lever element 19, is in turn located rotatably on the third lever element 21, via a third pin element forming a third pivot point 35.

The third lever element 21 is located on the base body 3 of the stop module 1, by means of a fourth pin element 37 forming a fourth pivot point 27. The third lever element 21 is also guided via a fifth element 39 in a recess 41 of the stop element 9, and the stop element 9 is embodied with a body 42, which extends essentially in the direction of motion of the objects and in which the recess 41, also extending at least approximately in the direction of motion of the objects, is located, so that when the third lever element 21 is not moving, the stop element 9 is movable in the direction of motion X of the objects relative to the third lever element 21.

The third pivot point 35 is located on the third lever element 21, between the fourth pivot point 37 and the fifth pin element 39. The first lever element 17 and the second lever element 19 of the toggle lever device 11, when the stop element 9 is protruding into the movement plane of the objects, are located at least approximately parallel to one another; that is, the first pivot point 18, second pivot point 23, and third pivot point 35 are located at least approximately on the same axis.

The electrical rotary drive 13 is located at least approximately below the first pivot point 18, and the electrical rotary drive 13 cooperates with the first pivot point 18 by means of a hub element 43, visible in FIG. 4 and located on a drive axle 45 of the electrical rotary drive 13, and by means of a connecting rod assembly 47, located eccentrically to the hub 43 on the drive axle 45 of the electrical rotary drive 13.

The connecting rod assembly 47 is embodied with a round terminal region 49, which encloses a ball bearing 48 located on the hub element 43, so that the connecting rod assembly 47 is connected rotatably to the hub element 43 via an O-ring 53, located between the connecting rod assembly 47 and the hub element 43.

A rotation of the drive axle 45 of the electrical rotary drive 13 causes a rotation of the hub element 43, which because of the eccentric location of the connecting rod assembly 47 causes a rotary motion of the round terminal region 49 of the connecting rod assembly 47 about the drive axle 45.

Since the connecting rod assembly 47 is connected, in its upper end region 55 via the first pivot point 18, to the first lever element 17 of the toggle lever device 11, the connecting rod assembly 47 is moved downward at its upper end, from the situation shown in FIG. 3, by means of a rotation of the drive axle 45 of the electrical rotary drive 13 along a circular path 57 extending around the second pivot point 23.

Such a motion of the first lever element 17 downward rotates the second lever element 19 of the toggle lever device 11, via the first pivot point 18, and as a result, the third pivot point 35 in turn is moved at least approximately in the direction of the second pivot point 23. As a result, the third lever element 21 is rotated about the fourth pivot point 37, so that an at least partly downward-oriented force acts on the stop element 9, and the stop element 9 is moved out of the movement plane of the objects for enabling their motion in the direction of motion X.

By reversal of the direction of rotation of the drive axle 45 by the electrical rotary drive 13, the aforementioned operations can be performed in the reverse direction of motion, so that the stop element 9 can be moved out of its lower, second terminal position back to its upper, first terminal position.

It is also conceivable here for the interaction of the electrical rotary drive with the hub element, connecting rod assembly and toggle lever device to be embodied such that the electrical rotary drive, solely by a rotation of the drive axle in one direction, is capable of executing both a motion of the stop element out of the movement plane of the objects and a motion of the stop element into the movement plane of the objects.

As already mentioned earlier above, the stop module 1 has a damping device 15. The damping device 15 is intended for damping a motion of the stop element 9 out of a first stop position, visible for instance in FIG. 3, into a second terminal stop position, offset from the first stop position in the direction of motion X of the objects, when an object is in contact with the stop element 9.

For that purpose, as already described above, when the third lever element 21 is stationary, the stop element 9 is displaceable relative to the third lever element 21 in the direction of motion X of the objects by means of the fifth pin element 39 that is guided in the recess 41 of the body 42 of the stop element 9.

If an object, moving in the direction of motion X in the movement plane, comes into contact with the stop element that is in its first terminal position, then the object, as a result of its force exerted on the stop element 9, moves the stop element 9 in its direction of motion. As a result, a rotary lever 59, visible in particular in FIGS. 4 and 5, which on an end of the stop element 9 that is remote from the fifth pin element 39 of the stop element 9 is connected rotatably to the stop element 9 via a fifth pivot point 61, is rotated about a shaft 63 supported in the base body 3. The rotary lever 59 is located on the shaft 63, and thus in such a rotary motion of the rotary lever 59, the shaft 63 rotates accordingly with it.

The rotary lever 59 has a protrusion 65, which, when the stop element 9 is in its first terminal position, cooperates with a restoring device that in this situation is essentially not prestressed and which is embodied in this case as a spring assembly 69 embodied with a compression spring 67.

Upon a transfer of the stop element 9 from its first stop position to its second terminal stop position, the compression spring 67 of the spring assembly 69 is prestressed by a resultant rotation of the rotary lever 59 and acts counter to the force exerted on the stop element 9 by the object contacting the stop element 9.

Now, if the stop element 9 is transferred via the toggle lever device 11 to its lower, second position by the electrical rotary drive 13, then the object contacting the stop element 9 becomes disengaged from the stop element 9, and as a result, there is no longer any contrary force on the stop element 9 to the force exerted on the stop element 9 by the prestressed compression spring 67 of the spring assembly 69 by means of the rotary lever 59. The compression spring 67 of the spring assembly 69 thus rotates the rotary lever 59 back into the position shown for instance in FIG. 3.

This motion of the rotary lever 59 is limited by a sixth pin element 71, which is located in the base body 3 and on an upper side of the protrusion 65 of the rotary lever 59.

Figure 5:
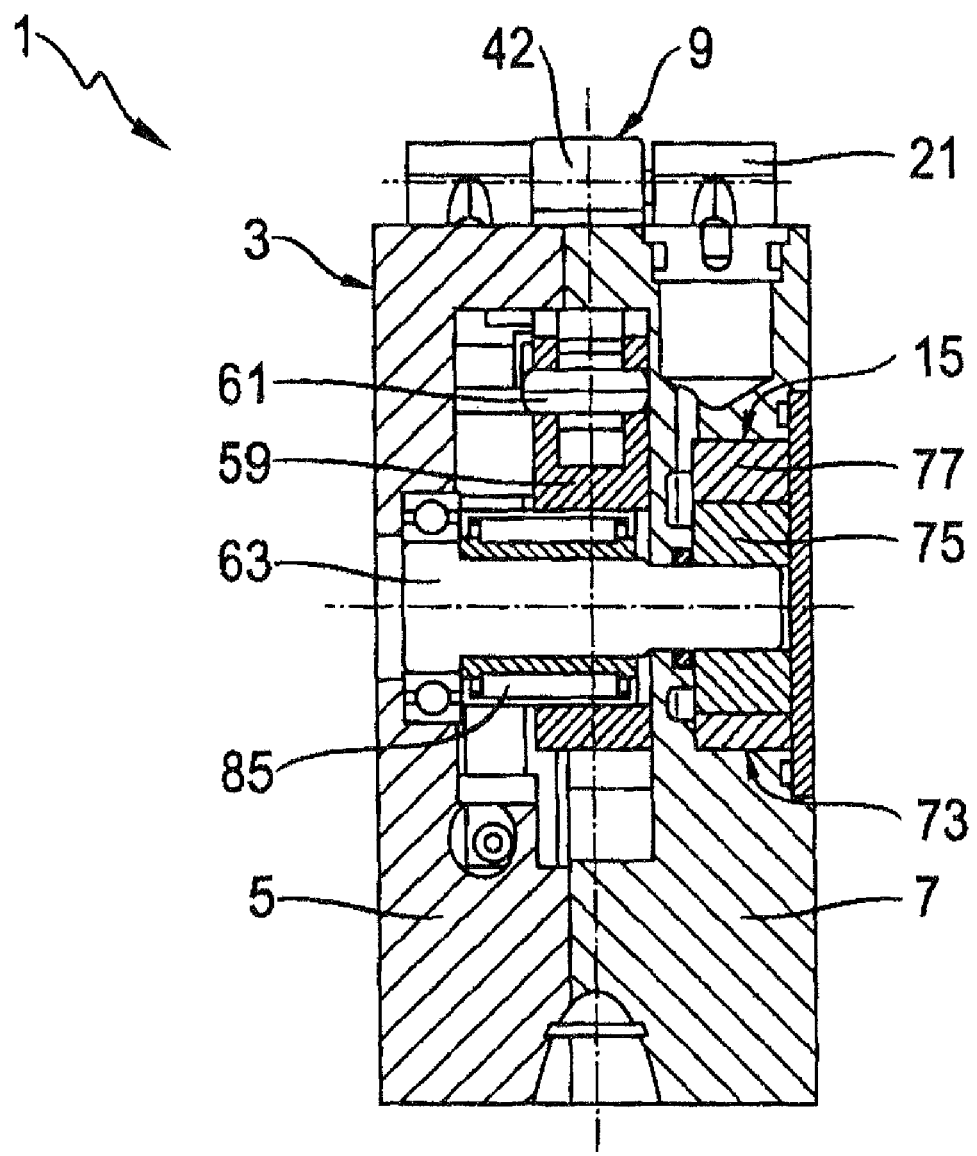
FIG. 5 is a further sectional view through the stop module taken along the axis B-B in FIG. 3.

On the shaft 63, a rotation damper 73 is located next to the rotary lever 59, in a region laterally offset from it. The rotation damper, which is visible in FIGS. 1 and 5, is embodied in particular as a Gerotor 73 and has an inner rotor 75, located on the shaft 63 in a manner fixed against relative rotation, and an outer rotor 77, supported in the base body 3; the outer rotor 77 is located eccentrically to the inner rotor 75. A number of teeth 79 of the inner rotor 75—in this case six teeth—is less by one than a number of recesses 81 of the outer rotor 77—in this case seven recesses—that cooperate with the teeth 79 of the inner rotor 75.

The inner rotor 75 of the rotation damper 73, connected to the shaft 63 via a form-locking connection, is set to rotation via the shaft 63 upon a rotation of the rotary lever 59.

Upon a rotation of the rotation damper 73, positive displacement chambers are created between the points of contact of the inner rotor 75 and outer rotor 77, and the volume of these chambers varies during the rotation. This variation is sinusoidal, and as a result a very uniform pumping operation is generated. Because of the compulsory positive displacement, a fluid feed flow that is generated by the rotation damper 73 and transmitted by an incompressible fluid, such as an oil, varies in proportion to the rpm. This fluid feed flow can be influenced in such a way by a throttle restriction 83, embodied in particular adjustably, that a braking moment acting on the shaft 63 and, via the rotary lever 59, counteracting a motion of the stop element 9 from its first stop position to its second terminal stop position, is generated.

By means of this braking moment, a motion of the stop element 9, moved from its first stop position to its second terminal stop position by an object, can be damped, and thus the forces acting on the object are advantageously reduced.

A freewheel device 85 is also located on the shaft 63; by means of it, a motion of the rotary lever 59 for moving the stop element 9 from its second terminal stop position to its first stop position is decoupled from the rotation damper 73, so that such a motion of the stop element 9 can be executed with very little expenditure of force, and the compression spring 67 of the spring assembly 69 can be embodied as suitably small.

The sequence of motion of the stop module 1 when an object comes into contact with the stop element 9 is thus as follows:

The object striking the stop element 9 displaces the stop element 9 from its first terminal position to its second stop position, and as a result, the rotary lever 59 tenses the compression spring 67, likewise cooperating with the rotary lever 59, of the spring assembly 69. The object is fixed on the conveyor system.

In order to release the object again, the electrical rotary drive 13, here embodied as a stepping motor, rotates the hub element 43, which is located eccentrically to the connecting rod assembly 47. As a result of this rotary motion, the connecting rod assembly 47 executes a vertical motion downward, as a result of which the stop element 9, via the toggle lever device 11, can be lowered from its first position, in which it protrudes into the movement plane of the objects, into its second position that enables the motion of objects in the direction of motion X. During this downward motion of the stop element 9, the compression spring 67 of the spring assembly 69 relaxes and moves the rotary lever 59 back to its outset position.

By means of an opposed rotary motion of the electrical rotary drive 13, the stop element 9 can then be moved back into its first position.

Figure 4:
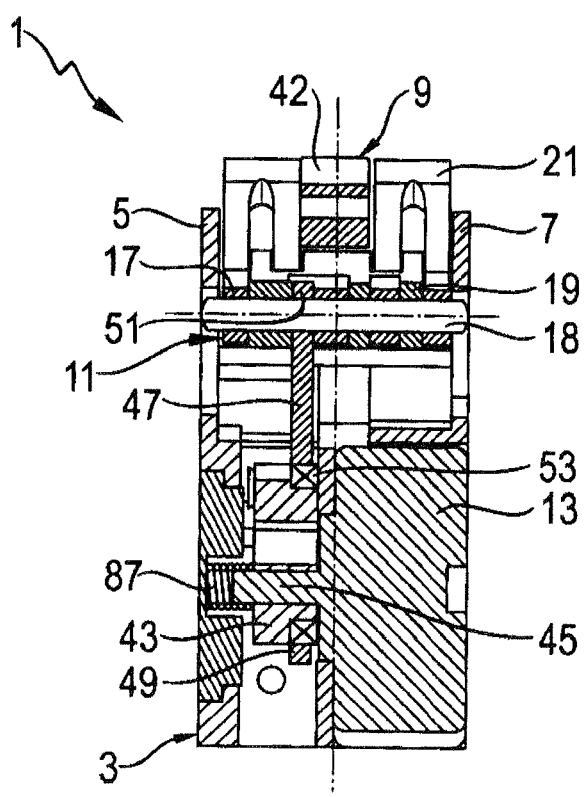
FIG. 4 is a sectional view through the stop module taken along the axis A-A in FIG. 3.

In FIG. 4, a leg spring 87 is shown, which is provided for moving the stop element 9 back to its first position in a currentless state.

Figure 6:
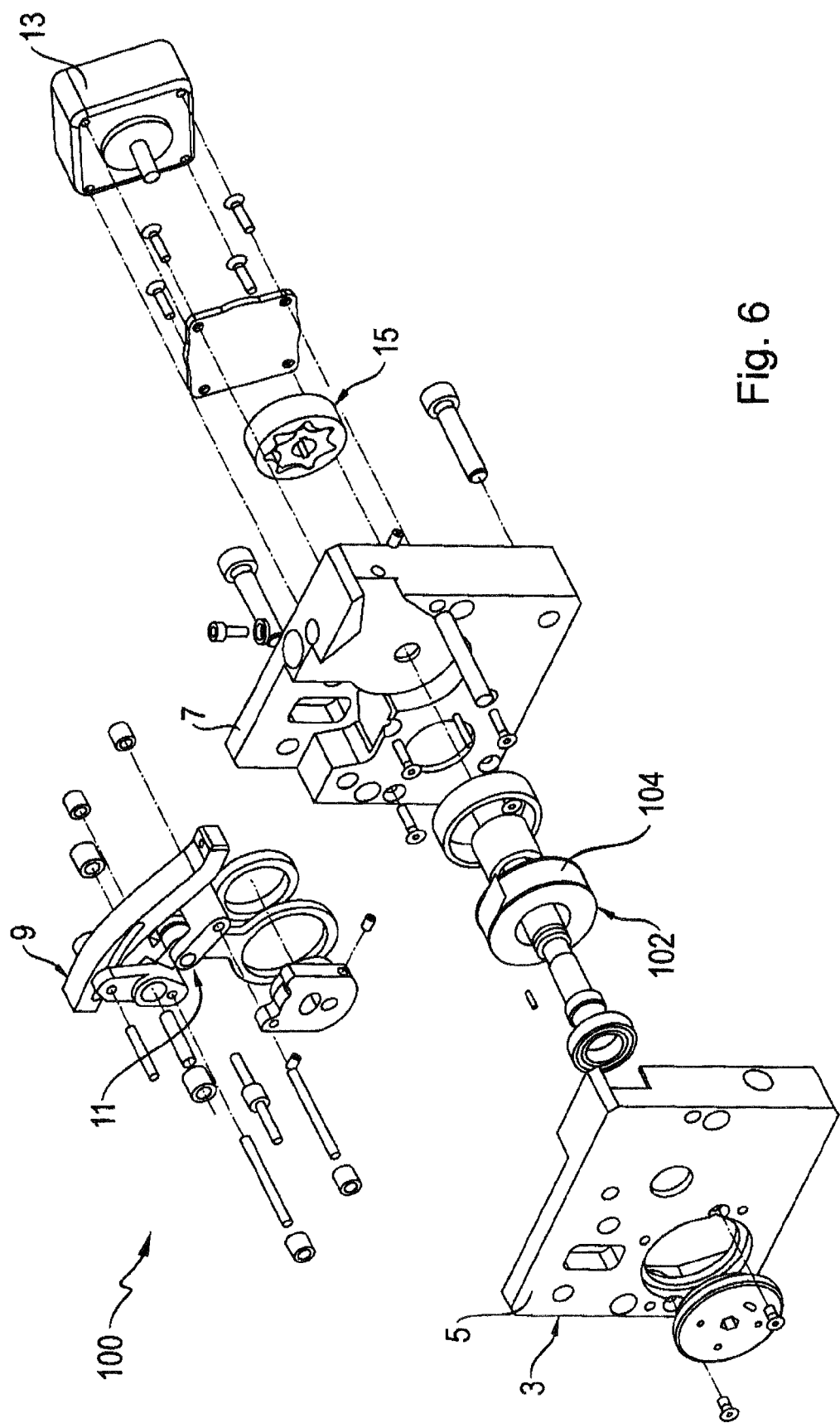
FIG. 6 is an exploded view of a stop module embodied alternatively to that of FIGS. 1 through 5.
Figure 7:
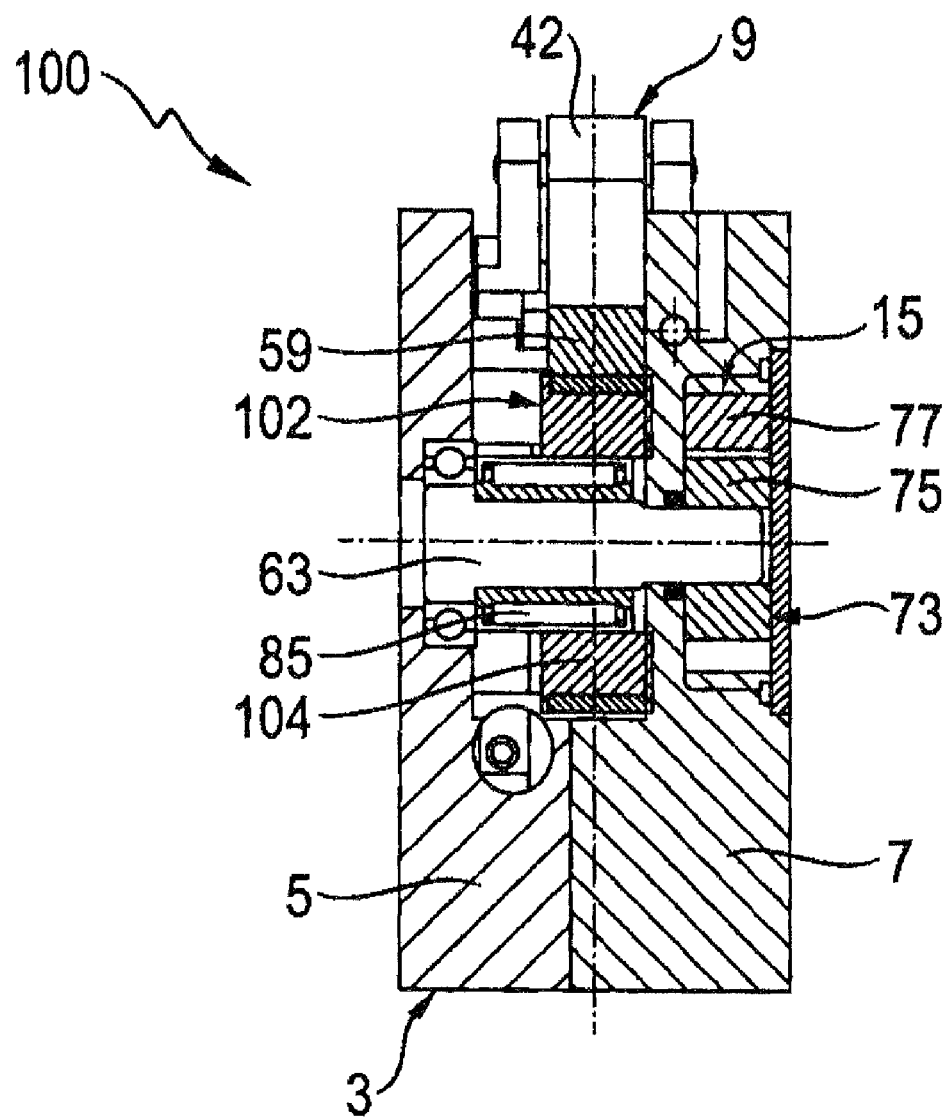
FIG. 7 is a sectional view through the stop module of FIG. 6, in which the section through the stop module extends analogously to the axis B-B shown in FIG. 3.

In FIGS. 6 and 7, a further stop module 100 is shown, which compared to the stop module 1 shown in FIGS. 1 through 5 is embodied differently essentially in terms of its restoring device 102. For the sake of simplicity, functionally identical components are identified by the same reference numerals as in the embodiment of FIGS. 1 through 5.

Here, the restoring device has a spring assembly 102, embodied as a tension spring 104, which is embodied in particular in the form of a constant-force spring. The tension spring 104 is located on the shaft 63 in such a way that, when a stop element 9 is located in its second terminal stop position, the spring assembly 102 exerts a force that presses the stop element 9 in the direction of its first stop position.

It is understood that the variant embodiments described are merely examples, and thus combinations of the embodiments described and departures thereof are covered by the invention.

It will be understood that each of the elements described above, or two or more together, may also find a useful application in other types of constructions differing from the types described above.

While the invention has been illustrated and described as embodied in a stop module, in particular for automatic machining and conveyor systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected Letters Patent is set forth in the appended claims:

1. A stop module, comprising:
 a base body;
 a stop element configured for objects moving in a direction of motion in a movement plane and located on said base body;
 a drive device for moving said stop element between a first terminal position, in which the stop element protrudes into the movement plane of the objects, and a second terminal position, in which said stop element enables a motion of objects in the movement plane; and
 a damping device cooperating with said stop element for damping a motion of said stop element from a first stop position into a second terminal stop position, which is offset relative to said first stop position at least approximately in the direction of motion of the objects, when an object is resting on said stop element, said damping device being configured so as to damp the motion of said stop element from said first stop position to said second terminal stop position with a rotation damper,
 wherein said rotation damper has an inner rotor and an outer rotor located eccentrically to said inner rotor, and wherein said outer rotor includes recesses that cooperate with teeth of said inner rotor, wherein a number of recesses in said outer rotor is greater by one than a number of teeth of said inner rotor.

2. A stop module as defined by claim 1, wherein the stop module is configured for automated machining and conveyor systems.

3. A stop module as defined in claim 1, wherein said rotation damper is configured as a Gerotor including said inner rotor and said outer router.

4. A stop module as defined in claim 1, wherein said rotation damper has a throttle restriction.

5. A stop module as defined in claim 4, wherein said throttle restriction is configured as an adjustable throttle restriction.

6. A stop module as defined in claim 1, further comprising an axle with a rotary lever that converts at least approximately translational motion of said stop element between its first stop position and its second stop position into a rotary motion, said inner rotor of said rotation damper being located on said axle.

7. A stop module as defined in claim 6, further comprising a free wheel device via which said inner rotor of said rotation damper cooperates with said rotary lever, so that said free wheel device decouples said inner rotor of said rotation damper from a rotation of said rotary lever, which rotation is such that said rotary lever moves said stop element from its second terminal stop position into the first stop position.

8. The stop module as defined by claim 1, further comprising a restoring device, by which said stop element is movable from its second terminal stop position into its first stop position.

9. A stop module as defined in claim 8, further comprising a rotary lever via which said restoring device cooperates with said stop element.

10. A stop module as defined in claim 1, further comprising a drive device which is configured as an electrical rotary drive.

11. A stop module as defined in claim 10, wherein said electrical rotary drive is a servo drive.

12. A stop module as defined in claim 10, further comprising a toggle lever device providing the motion of said stop element in and out of the movement plane of objects and cooperating with said electrical rotary drive, said toggle level device having at least two lever elements connected to one another via a first pivot point, said electrical rotary drive cooperating with said first pivot point.

13. A stop module as defined in claim 12, further comprising a connecting rod assembly, said electric rotary drive cooperating with said toggle lever device via said connecting rod assembly.

14. A stop module as defined in claim 12, wherein said first lever element of said toggle lever device in a first terminal region is located rotatably on said base body via a second pivot point and in a second terminal region cooperates rotatably via said first pivot point with a first terminal region of said second lever element, and a second terminal region of said level element cooperates via a third pivot point with a third lever element which is fixed rotatably on said base body via a fourth pivot point.

* * * * *